United States Patent [19]
Boyajian et al.

[11] 4,181,570
[45] Jan. 1, 1980

[54] POST-LOCA CORE FLUSHING SYSTEM

[75] Inventors: John D. Boyajian, Windsor; Paul A. Weinberger, Bloomfield, both of Conn.

[73] Assignee: Combustion Engineering, Inc., Windsor, Conn.

[21] Appl. No.: 667,731

[22] Filed: Mar. 17, 1976

[51] Int. Cl.² .................................................. G21C 9/00
[52] U.S. Cl. .................... 176/38; 176/58 R; 176/62
[58] Field of Search ................. 176/37, 38, 60, 65, 176/55, 50, 62

[56] References Cited
U.S. PATENT DOCUMENTS

| | | | |
|---|---|---|---|
| 3,575,807 | 4/1971 | Ripley | 176/55 |
| 3,859,166 | 1/1975 | Flynn et al. | 176/38 |
| 3,929,567 | 12/1975 | Schabert et al. | 176/38 |
| 4,051,892 | 10/1977 | Reinsch | 176/38 |

*Primary Examiner*—Samuel W. Engle
*Assistant Examiner*—Ralph Palo

[57] ABSTRACT

A system is disclosed for flushing the core of a nuclear reactor after a loss-of-coolant accident. A pump causes flow of liquid-phase fluid from the containment-vessel sump. This flow is used to provide the motivating force for an eductor that causes suction at the hot leg of the reactor. The eductor suction can draw gas-phase coolant out of the hot leg. As a result, it can reduce pressure which may be preventing the flow of liquid-phase coolant out of the hot leg. By causing liquid-phase flow through the reactor, the system ensures that particles and boric acid are flushed out of the core. The system thereby eliminates the build-up of particles and the concentrations of boric acid in the core that could result if the coolant were to leave the pressure vessel exclusively in the gas phase.

9 Claims, 1 Drawing Figure

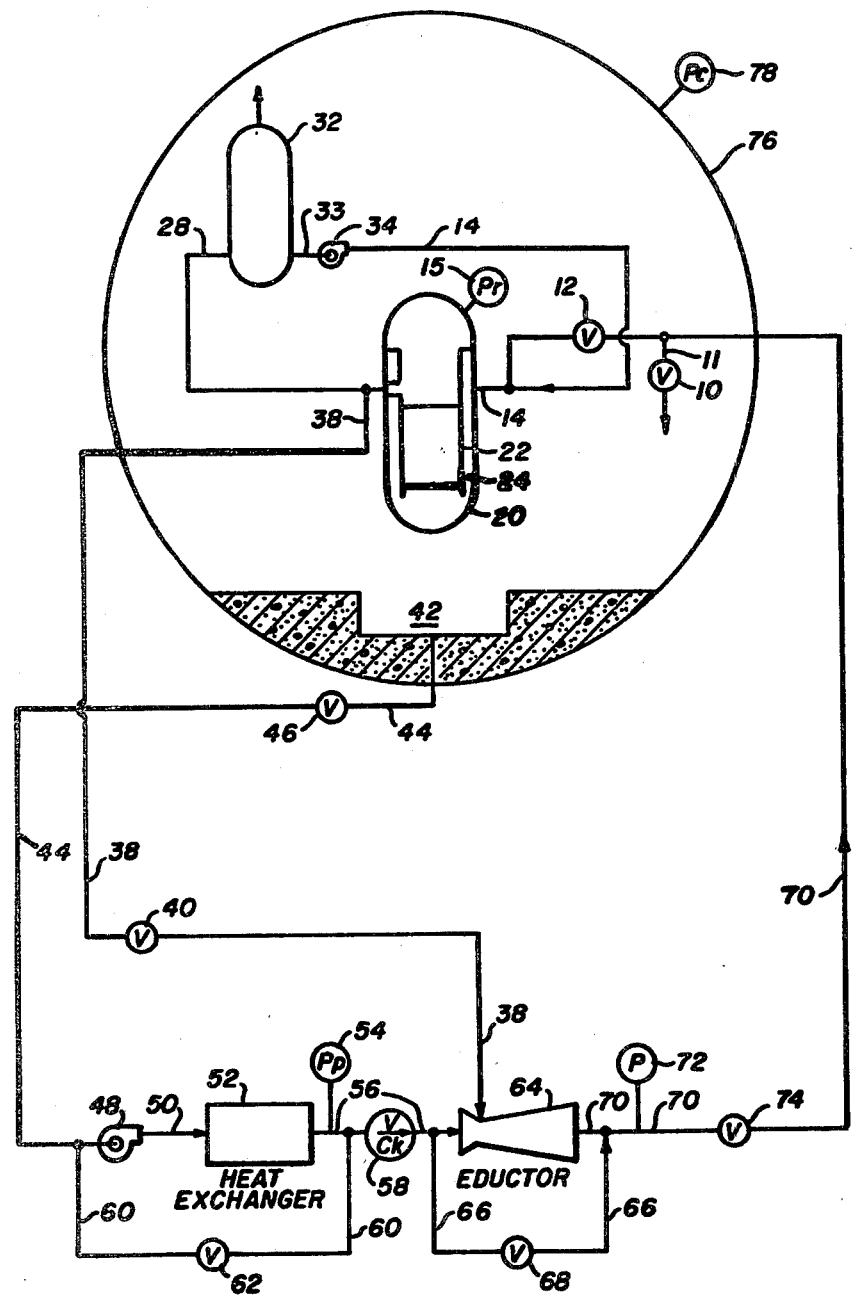

POST-LOCA CORE FLUSHING SYSTEM

BACKGROUND OF THE INVENTION

The present invention relates to an emergency core-cooling system for dealing with loss-of-coolant accidents in nuclear reactors. In particular, this invention is a system for ensuring that liquid-phase flow through the reactor vessel will flush the core, thereby preventing the accumulation of debris and the concentration of emergency-coolant additives that might otherwise occur.

In the event of a malfunction, such as a break in a coolant line, that results in loss of coolant from the core, it is typical for water containing a neutron-absorbing "poison" to be injected into the reactor pressure vessel to the primary-coolant-system input, or cold leg. The system for supplying the emergency coolant is designed to provide more than enough coolant to cool the core, regardless of the size of the break. The overflow resulting from the coolant injection leaves through the break, spilling into the sump. This mode of operation is known as the *injection mode*. When the supply used in the injection mode runs low, the *recirculation mode* begins, in which a pump causes the coolant that has been accumulated in the sump to flow back through the cold leg and into the core again. If the defect is a large break in the reactor output, or *hot leg*, the coolant flows from the sump, into the cold leg, down the annulus between the core barrel and the pressure vessel, up through the core, out the hot leg, through the hot-leg break, and back into the sump. This effects a flushing flow through the core that purges it of debris and concentrations of coolant additives, facilitating long-term operation in the recirculation mode.

However, somewhat different results are obtained if the break is in the cold leg. Due to such factors as the flow resistance of the steam-generator primary tubes and the fact that parts of those tubes are at a higher elevation than the hot- or cold-leg openings in the reactor vessel, the primary coolant circuit resists flow out of the hot leg, so the spillage of excess coolant from the cold-leg break is made up almost exclusively of coolant that has backed up in the annulus rather than coolant which has flowed through the core, out the hot leg, through the steam generator, and out the cold-leg break. As a result, the only flow to the core is that which is required to make up for the coolant that has escaped as steam; flow *through* the core, at least for flushing purposes, is negligible. In addition, it is conceivable under certain circumstances that the flow of steam through the primary coolant circuit could be retarded sufficiently to cause perceptible increases in the vapor pressure within the pressure vessel, possibly resulting in some depression of the reactor-vessel coolant level. This potential coolant-level depression is to be avoided because even the little liquid-phase flow that might otherwise occur in spite of the coolant-circuit flow resistance is prevented if the coolant level becomes depressed below the level of the hot-leg openings in the core barrel. The results of this prevention of liquid-phase flow through the core could be that particulate matter pumped from the sump into the core would accumulate there, and a concentration of additives, such as boric acid, would increase as the water component of the coolant is boiled away. It is not anticipated that these results would be beneficial.

Of course, the problem of providing a flushing flow following a cold leg break can be solved by introducing the coolant into the hot leg, but this solution depends for its efficacy upon the ability of the operator to locate the break, and it may not always be possible to guarantee that an operator would be able to locate the break in a short amount of time. In addition, even proper selection of the location into which the coolant is to be introduced is not necessarily the solution to the problem of reactor-vessel pressure increases. For instance, it could be that a break may be small enough to maintain a significant vapor pressure in the reactor vessel, preventing the liquid levels for reaching the hot-leg outlet. If such a break were to occur, flushing flow would be prevented despite coolant introduction at the proper location.

SUMMARY OF THE INVENTION

It is therefore an object of the present invention to provide a system that can ensure long-term operation of an emergency core-coolant system by maintaining liquid-coolant flow through the core, thereby providing flushing, without making it necessary that an operator know the size or location of the break. It is another object of the invention to reduce the possibility of vapor-pressure buildup in the pressure vessel.

According to the present invention, a path is provided bertween the hot leg and the containment structure. When it is determined that flusing is required, a valve in this path is opened, allowing fluid to escape to the interior of the containment structure, where the liquid phase is collected by a sump formed in the floor of the containment structure. The escape of fluid into the containment structure equalizes the pressures in the pressure vessel and the containment structure. Means are provided for sensing these pressures, and when the pressures are equal, the path is closed. A valve is then opened, connecting the sump to a pump. The sump liquid is cooled by a heat exchanger fed by the pump, and the flow of fluid leaving the heat exchanger is used to motivate an eductor that provides suction to the hot leg. This suction further reduces the pressure at the hot leg of the reactor vessel. The reduced pressure ensures that the level of the liquid in the core barrel reaches the hot-leg level, permitting the liquid to flow out the hot leg and establishing a flushing flow through the core. The liquid and vapor drawn from the hot leg by the eductor is combined with the cooled sump liquid, and the combination is injected through the cold leg back into the core. This arrangement has the advantage that it can be used on a long-term basis without the danger of corrosion or damage caused by an accumulation of additives and debris. In addition, the operator does not need to know the size and location of the break in order to successfully use the system. Finally, by using an eductor to cause coolant flow, the system operates regardless of whether the coolant is in the liquid or gaseous state and regardless of whether relatively large particulate matter is carried by the coolant.

BRIEF DESCRIPTION OF THE DRAWING

The FIGURE shows a diagram of a system according to the present invention for coolant and flushing a reactor core. A typical embodiment will include a plurality of cold legs and hot legs, but for the sake of simplicity only one of each is shown.

DESCRIPTION OF THE PREFERRED EMBODIMENT

The figure shows a simplified representation of a pressurized-water reactor. During normal operation, coolant flows in through cold leg 14, down the annulus 24 formed between core barrel 22 and reactor vessel 20, up through core 26, and out hot leg 28. In the embodiment of the present invention shown in the figure, the downstream end of core 26 constitutes the first end mentioned in the claims, and the upstream end of the core constitutes the second end. The interior of reactor vessel 20 is kept at a high pressure so that the coolant will remain in the liquid state even after it has been heated by the core. The pressure within reactor vessel 20 is therefore greater than that in the rest of the interior of containment structure 76. Core barrel 22 surrounds the core in order to prevent coolant entering through cold leg 14 from gaining access to the core from anywhere but the bottom. Coolant flows through hot leg 28 to the primary inlet of steam generator 32, whose primary outlet is connected to pump 34 by coolant line 33, and the coolant returns to reactor vessel 20 by way of cold leg 14. Thus, during normal operation, heat transferred to the coolant by core 26 is released to a secondary coolant by steam generator 32, and the flow between the core and the steam generator is maintained by the operation of pump 34. The mechanism for transferring the heat generated by core 26 to a secondary coolant is referred to in the claims as a "primary coolant circuit." It has a first part including a primary motivating means, an example of which is pump 34, and a primary heat-removal means, an example of which is steam generator 32. The primary coolant circuit also has a second part comprising a core, element 26 in the figure, and means for providing fluid communication between the two ends of the core and the two ends of the first part of the primary coolant circuit. One of these means includes hot leg 28; the other includes cold leg 14 and annulus 24.

It is to be noted that the considerations previously discussed with respect to a break in cold leg 14 also apply to a break in coolant line 33. Accordingly, any discussiong pertaining to cold-leg breaks also applies to breaks in coolant line 33.

According to the present invention, coolant line 38, whose flow is controlled by valve 40, connects hot leg 28 to the suction inlet of a first suction means, eductor 64. As used in the claims, an *eductor* is an apparatus that uses a flow-induced reduction in static pressure to cause suction at a suction inlet; fluid flowing between the motivating inlet of the eductor and its outlet causes pressure to be reduced at the suction inlet. The outlet of eductor 64 is connected through injection valve 74 and cold-leg valve 12, to cold leg 14. The outlet of eductor 64 is also connected to the interior of containment structure 76 through injection valve 74 and containment valve 10 by means of coolant lines 70 and 11. Together, coolant line 70, cold-leg valve 12, cold leg 14, and annulus 24 constitute means for selectively providing fluid communication between the eductor and the second end of the core. Coolant lines 70 and 11 and containment valve 10 together constitute means for selectively providing fluid communication between the eductor and the interior of the containment structure.

The floor of containment structure 76 forms sump 42, whose outlet feeds a pump 48, through coolant line 44 and sump valve 46. Pump 48 is typically also a component of the injection-mode system, but only those connections relevant to recirculation-mode flushing are shown. Pump 48 feeds the primary inlet of a means for cooling at least a part of the fluid in the network, heat exchanger 52, through coolant line 50. The primary outlet of heat exchanger 52 is fed through check valve 58 to the motivating inlet of eductor 64. Check valve 58 is a means for permitting flow from the primary outlet of the heat exchanger to the motivating inlet of the eductor and preventing fluid flow from the motivating inlet of the eductor to the primary outlet of heat exchanger. Pump 48 and heat exchanger 52 are shunted by a fluid conduit pump bypass line 60, that connects the primary outlet of the heat exchanger to the inlet of the pump. The flow through pump bypass line 60 is controlled by recirculation valve 62. Eductor 64 is shunted by eductor bypass line 66, whose flow is controlled by bypass valve 68.

The containment pressure $P_c$ is measured by sensor 78. Reactor-vessel pressure $P_r$ is measured by sensor 15, heat-exchanger pressure $P_p$ is measured by sensor 54, and eductor outlet pressure P is measured by sensor 72.

In the event of a loss-of-coolant accident, appropriate means not shown in the figure inject coolant into cold leg 14, thereby filling the reactor vessel to a level high enough to cover the core. This injection continues until the external source or sources supplying the injection means run low, by which time sump 42 has an inventory of coolant sufficiently large to enable the recirculation mode to begin. Either before or after the recirculation mode is started, it may be decided that flushing is desirable. If it is decided that flushing is desirable, suction valve 40, injection valve 74, and containment valve 10 are opened, allowing liquid coolant or steam to flow from hot leg 28 through lines 38, 70 and 11 into the interior of the containment structure. This path remains open as long as $P_r$ exceeds $P_c$, and this tends to equalize reactor-vessel pressure $P_r$ and structure pressure $P_c$. As soon as $P_c$ reaches $P_r$, containment valve 10 closes, closing the path to the containment-structure interior. When this has been accomplished, pump 48 is activated. Typically, the recirculation mode will have commenced, and sump valve 46 will open to permit pump 48 to draw from the sump; it is this aspect of the system to which the present specification is directed. However, in the usual application of this system, appropriate connections will exist that enable pump 48 to draw from the injection-mode coolant sources (not shown), because pump 48 will typically be a part of the injection-mode system that has been adapted to the flushing function of the present invention. Therefore, if $P_r$ reaches $P_c$ while the injection mode is still in progress, the typical emergency coolant system will have an arrangement for permitting injection mode flusing.

As was pointed out, however, the invention of the present disclosure is related to recirculation-mode flushing, so it is assumed that recirculation has started through some means not a part of the present invention when $P_r$ reaches $P_c$. At that point, the activation of pump 48 causes the flow of liquid from sump 42 through heat exchanger 52. Recirculation valve 62 is open initially and, in combination with check valve 58, causes the fluid flowing through pump 48 and heat exchanger 52 to be shunted around the rest of the system. When heat-exchanger pressure $P_p$, as detected by sensor 54, is greater than eductor outlet pressure P, as detected by sensor 72, recirculation valve 62 closes. AT the same time, check valve 58, which prevents the initial high pressure in coolant line 38 from affecting heat exchanger 52, opens due to the forward pressure on it, allowing the sump flow to be injected into the motivating inlet of eductor 64. This motivating flow causes a low pressure in coolant line 38, and coolant is consequently drawn from the hot leg into eductor 64.

Since the fluid leaving hot leg 28 is, at least initially, composed both of gas and liquid, and since it is possible that it could carry particles of a size harmful to a conventional pump, the use of an eductor is particularly well suited to this application with an eductor can be used effectively to draw compressible fluids and is less likely than a conventional pump to be adversely affected by relatively large particles. Thus, while the motivating force for drawing fluid from the hot leg is ultimately supplied by pump 48, the fact that the pump is relatively ineffective at drawing compressible fluids and is likely to be harmed by large particles does not detract from its effectiveness when it is used in connection with eductor 64.

When eductor outlet pressure P reaches a predetermined value, cold-leg valve 12 is opened, containment valve 10 is closed, and the combination of sump flow and hot-leg flow leaving the outlet of eductor 64 passes back into pressure vessel 20 through injection valve 74 and cold-leg valve 12. This final mode of operation is suitable for long-term application and can therefore be used even when defect detection and correction last for a relatively long time. In this mode suction is continually applied to the hot leg, maintaining the liquid-phase coolant level sufficiently high and the hot-leg pressure sufficiently low that liquid flows out the hot leg. The desired flow rate is achieved by regulating the suction flow and suction force by means of suction valve 40 and bypass valve 38, respectively.

What is claimed is:

1. In a nuclear-reactor system that has a primary coolant circuit for circulating fluids, the primary coolant circuit having a first part comprising a primary heat-removal means and a primary motivating means and a second part comprising a fuel-containing core, means for providing fluid communication between a first end of the core and a first end of the first part of the primary coolant circuit, and means for providing fluid communication between a second end of the core and a second end of the first part of the primary coolant circuit, which nuclear-reactor system further comprises a sump for collecting liquid and a containment structure, having an interior, for preventing escape to the outside atmosphere of material from the coolant circuit, an apparatus for emergency cooling of the core, comprising:
   a. an eductor having a motivating inlet, a suction inlet, and an outlet, the means for providing fluid communication between the first end of the core and the first end of the first part of the primary coolant circuit being connected to the suction inlet for fluid communication therewith, the eductor thereby being arranged to draw fluid from the primary coolant circuit;
   b. means for selectively providing fluid communication between the outlet of the eductor and the interior of the containment structure;
   c. means for selectively providing fluid communication between the outlet of the eductor and the second end of the core; and
   d. a pump having an inlet and an outlet, the inlet being connected to the sump for fluid communication therewith and the outlet being connected to the motivating inlet of the eductor for fluid communication therewith.

2. An apparatus as recited in claim 1, further comprising means for cooling at least part of the fluid drawn by the pump and the eductor.

3. An apparatus as recited in claim 2, wherein the cooling means is a heat exchanger having a primary circuit arranged between a primary heat-exchanger inlet and a primary heat-exchanger outlet, wherein the fluid communication between the outlet of the pump and the motivating inlet of the eductor is provided by means including the primary heat-exchanger circuit, the primary heat-exchanger inlet being connected to the outlet of the pump to provide fluid communication therewith, and the primary heat-exchanger outlet being connected to the inlet of the eductor to provide fluid communication therewith.

4. An apparatus as recited in claim 3, further comprising:
   a. a pump bypass line connected in parallel across the pump and heat-exchanger;
   b. a valve means interposed in the pump bypass line for controlling flow through the pump bypass line;
   c. an eductor bypass line connected in parallel with the eductor;
   d. a valve means interposed in the eductor bypass line; and
   e. a check-valve means interposed between the primary outlet of the heat exchanger and the motivating inlet of the eductor and oriented to permit flow from the heat exchanger to the eductor but prevent flow from the eductor to the heat exchanger.

5. A method for emergency cooling of a fuel-bearing core in a nuclear-reactor system that comprises a primary coolant circuit for circulating fluids, the primary coolant circuit consisting of a first part and a second part, the first part comprising a primary heat removal means, the second part comprising a fuel-containing core, means for providing fluid communication between a first end of the core and a first end of the first part of the primary coolant circuit, and means for providing fluid communication between the second end of the core and a second end of the first part of the primary coolant circuit, which nuclear-reactor system further comprises a sump for collecting liquid and a containment structure, having an interior, for preventing escape to the outside atmosphere of material from the coolant circuit, comprising the steps of:
   a. withdrawing liquid from the sump, thereby causing a flow of liquid;
   b. employing the flow of liquid from the sump to withdraw enough vapor from the primary coolant circuit at the first end of the core to lower the pressure in the core to a pressure below that in the containment structure and allow liquid to flow from the first end of the core;
   c. employing the flow of liquid from the sump to withdraw liquid from the primary coolant circuit at the first end of the core; and
   d. delivering at least a portion of the withdrawn fluid to the second end of the core, withdrawal of liquid from the first end of the core and delivery to the second end of the core thereby providing a flushing flow through the core.

6. The method as recited in claim 5 further comprising the step of diverting at least a portion of the withdrawn fluid to the interior of the containment structure while the pressure at the first end of the core exceeds the pressure in the interior.

7. The method as recited in claim 6 further comprising the step of cooling at least a portion of the withdrawn fluid.

8. A method as recited in claim 5, further comprising the step of diverting at least a portion of the withdrawn fluid to the interior of the containment structure while the pressure at the first end of the core feeds the pressure in the interior.

9. A method as recited in claim 8, further comprising the step of cooling at least a portion of the withdrawn fluid.

* * * * *

UNITED STATES PATENT AND TRADEMARK OFFICE
CERTIFICATE OF CORRECTION

PATENT NO. : 4,181,570
DATED : January 1, 1980
INVENTOR(S) : John D. Boyajian, et al It is certified that error appears in the above—identified patent and that said Letters Patent is hereby corrected as shown below:

Column 2, line 65, "coolant" should read --cooling--

Column 4, line 54, "flusing" should read --flushing--
line 67, "AT" should read --At--.

Signed and Sealed this

Twenty-seventh Day of May 1980

[SEAL]

Attest:

SIDNEY A. DIAMOND

Attesting Officer     Commissioner of Patents and Trademarks